Figure 1:
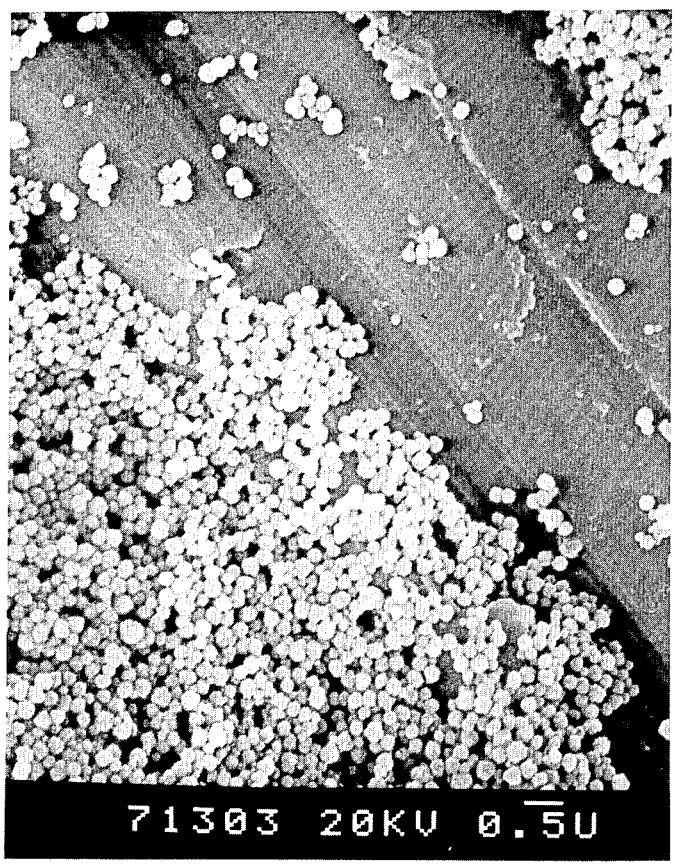

United States Patent [19]

Matushita et al.

[11] Patent Number: 4,898,843
[45] Date of Patent: Feb. 6, 1990

[54] TITANATE POWDER AND PROCESS FOR PRODUCING THE SAME

[75] Inventors: Fumio Matushita; Kageyasu Akashi, both of Kawasaki; Satoshi Sekine, Yokohama, all of Japan

[73] Assignee: Asahi Kasei Kogyo Kabushiki Kaisha, Japan

[21] Appl. No.: 157,093

[22] Filed: Feb. 9, 1988

Related U.S. Application Data

[63] Continuation of Ser. No. 659,704, Oct. 11, 1984, abandoned.

[30] Foreign Application Priority Data

Oct. 12, 1983 [JP] Japan .............................. 58-189249
Oct. 26, 1983 [JP] Japan .............................. 58-199173

[51] Int. Cl.$^4$ ............................................. C04B 35/46
[52] U.S. Cl. .................................... 501/136; 501/137; 423/593; 423/598
[58] Field of Search ............... 501/136, 137; 423/593, 423/598

[56] References Cited

U.S. PATENT DOCUMENTS

| | | | |
|---|---|---|---|
| 3,647,364 | 3/1972 | Mazdiyasni et al. | 423/598 |
| 4,293,534 | 10/1981 | Arendt | 423/598 |
| 4,487,755 | 12/1984 | Arendt | 423/598 |
| 4,520,004 | 5/1985 | Uedaira et al. | 423/598 |
| 4,534,956 | 8/1985 | Arendt et al. | 423/598 |
| 4,543,341 | 9/1985 | Barringer et al. | 423/593 |

OTHER PUBLICATIONS

Barringer, E. A. et al., "Formation Packing and Sintering of Monodisperse $TiO_2$ Powders", J. Am. Cer. Soc. 65(12), Dec. 1982, C199–C201.
Smith, J. S. et al., "Preparation and Characteristics of Alkoxy–Derived $SrZrO_3$ and $SrTiO_3$" J. Am. Cer. Soc. 53 (1970) pp. 91–95.
Kubo, Teruichiro et al., Kogyo Kagaku Zasshi 71(1) 1968) pp. 114–118.
Gallagher, P. K. et al., "Preparation of Semiconducting Titanates by Chemical Methods" J. Am. Cer. Soc. 46 (1963) pp. 359–365.
Mazdiyasni, K. S. et al., "Preparation of High Purity Submicron Barium Titanate Powders" J. Am. Cer. Soc. 52 (1968) pp. 523–526.
Matsuoka, K. et al., "Hydrothermal Synthesis of $BaTiO_3$" Report of Research Laboratory of Hydrothermal Chemistry, Kochi Univ, vol. 2(15) pp. 45–47.

*Primary Examiner*—William R. Dixon, Jr.
*Assistant Examiner*—Melissa Bonner
*Attorney, Agent, or Firm*—Finnegan, Henderson, Farabow, Garrett & Dunenr

[57] ABSTRACT

A powder consisting of barium titanate powder, strontium titanate powder or a solid solution thereof, characterized in that (a) its average particle diameter is 0.07 to 0.5μ, (b) its specific surface area measured is 20 m$^2$/g or less and does not exceed 2.5 times the specific surface area calculated from the average particle diameter on the assumption that the powder particles are spherical, (c) its crystallite diameter calculated from the half-width of the peak of the X-ray diffraction pattern for the powder is 0.05μ or more, and (d) its shape is substantially spherical. Said powder can be produced by reacting hydrous titanium oxide with barium hydroxide and/or strontium hydroxide at a temperature ranging from 60° C. to less than 110° C. in the presence of 120 to 2,000 moles of water per mole of titanium.

12 Claims, 4 Drawing Sheets

TITANATE POWDER AND PROCESS FOR PRODUCING THE SAME

This application is a continuation of application Ser. No. 659,704, filed Oct. 11, 1984, abandoned.

This invention relates to a novel powder consisting of barium titanate, strontium titanate or a solid solution thereof (hereunder the powder is referred to as the titanate powder) having a small particle diameter, a narrow particle size distribution and a substantially spherical shape, as well as to a process for producing the titanate powder. The present invention further relates to the novel titanate powder which can be sintered at low temperatures.

In order to produce a sintered body of high density and uniformity at a temperature as low as possible, it is generally required that the starting powder for the sintered body be fine, good in dispersion and uniform in particle diameter and shape.

Titanate powders, which have large particle diameters and non-uniformity of particle diameter distribution and shape, have industrially been used. These powders require a high temperature, at least 1,300° C., in order to sinter them up to 90% in relative density.

On the other hand, in laboratory, the titanate powders, which have a small particle diameter, have been synthesized. But they, not only being poor in dispersion but also being non-uniform in particle diameter and shape, are difficult to pack uniformly, resulting in non-uniform sintering and causing variations in dimensional accuracy and physical property.

Titanates are now in wide use as a material for electronic parts such as condenser, PTC element, semiconductor and the like. However, when a titanate is used, for example, in a multi-layer ceramic condenser, the fact that a temperature of 1,300° C. or more is required for sintering the titanate necessitates the use of a high melting noble metal such as palladium, platinum or the like and causes an increase of electrode cost. Moreover, grains in the sintered body become larger owing to grain growth, and hence, the distance between electrodes cannot be shortened and a condenser of high capacity cannot be realized; and variations in dimensional accuracy and physical properties cause a reduced yield and an increased cost. Hence, it has been strongly desired to overcome the above drawbacks.

Conventionally, titanate powders have industrially been produced by the solid phase reaction method. This solid phase reaction method is a method wherein barium salt (e.g. barium carbonate) or strontium salt (e.g. strontium carbonate) is mixed with titanium dioxide and they are reacted at a high temperature of 1,000° C. or more to synthesize barium titanate or strontium titanate. However, being conducted at a high temperature, this method is disadvantageous in that sintering has already started at the time of powder production, and particle-particle bonding and particle growth have occurred, and essentially, this makes it difficult to produce a barium titanate powder or a strontium titanate powder having a very small and uniform particle diameter.

Recently, there have been proposed new methods of the synthesis of a barium titanate powder and/or a strontium titanate powder, for example, the oxalic acid method, the alkoxide method, the hydroxide method and the like. These methods have overcome the above-mentioned disadvantages of the conventional solid phase reaction method to a considerable extent. For example, P. K. Gallagher et al. report in J. Am. Ceram. Soc., 46,359 to 365 (1963) that they had synthesized barium titanate powder of various particle diameters ranging from $0.09\mu$ to $0.73\mu$ by the oxalic acid method. Also, K. S. Madziyasni et al. report in J. Am. Ceram. Soc., 52, 523 to 526 (1969) that they have synthesized high purity barium titanates having a particle diameter ranging from 50 Å to 150 Å by the alkoxide method.

The oxalic acid method, however, is a method wherein an oxalate is burnt at a temperature of 600° C. or more to synthesize a titanate, and therefore, is close to the solid phase reaction method and tends to cause agglomeration of powder particles. The alkoxide method is expensive in starting materials and has a problem in the industrial scale production.

On the other hand, the hydroxide method is not yet an established technique; however it employs a simple production process, is inexpensive in starting materials and produces a powder having a high sinterability. For example, Kubo et al. report in Kogyo Kagaku Zasshi, Vol. 71, No. 1 (1968) that they have produced barium titanate at a conversion of 100% by mechanically mixing hydrous titanium oxide having a water content of 95% by weight with barium hydroxide in a barium to titanium ratio of 2 to 3 and then heating the mixture to 100° C. However, the barium titanate obtained by the Kubo et al. method has an angular shape very similar to the shape of hydrous titanium oxide, and therefore, its specific surface area is as large as 40.2 $m^2/g$, agglomerates of particles appear and the particle diameter distribution is non-uniform.

Hence, the Kubo et al. method is superior in that it can synthesize barium titanate in a high yield at a low temperature of 100° C., but is not satisfactory in respect of particle shape, particle agglomeration, particle diameter distribution, etc.

Matsuoka et al. describe in the Report of Research Laboratory of Hydrothermal Chemistry of Kochi University, Vol. 2, No. 15 (1978) that they synthesized barium titanate by mixing titanium oxide with barium hydroxide so that the ratio of elemental barium to elemental titanium became 1.2 and then treating the mixture at 110° to 370° C. in a stirring type autoclave. In this study, titanium oxide of a relatively large particle diameter was used and therefore, in order to obtain a conversion of 100%, a high temperature and a high pressure (300° C. and 85 atm. or more) were required and the particles of barium titanate produced were coarse. Matsuoka et al. also point out in the report that the addition of water during the mixing of titanium oxide and barium hydroxide resulted in a reduction of conversion.

Thus, in the study of the hydroxide method, no satisfactory barium titanate has been obtained, and there has been a tendency of limiting the amount of water to the necessary minimum amount when mixing the hydrous titanium oxide with the barium hydroxide in order to enhance the reaction conversion.

For the purpose of producing a titanate powder which can be uniformly sintered at a low temperature, the present inventors have conducted extensive research on the synthesis of a titanate powder having a very small and uniform particle diameter. As a result, it has been found that, in the hydroxide method, a novel titanate powder which has a very small and uniform particle diameter, spherical shape, a small specific surface area, and substantially no agglomeration can be synthesized by reacting hydrous titanium oxide with barium hydroxide and/or strontium hydroxide in the presence of a relatively large quantity of water and, if necessary, calcinining the reaction product at an appropriate temperature for completion of the reaction.

According to the present invention, there is provided a powder consisting of barium titanate powder, strontium titanate powder or a solid solution thereof, characterized in that (a) the average particle diameter is 0.07 to $0.5\mu$, (b) the specific surface area measured is 20 m$^2$/g or less and does not exceed 2.5 times the specific surface area calculated from the average particle diameter on the assumption that the powder particles be spherical, (c) the crystallite size calculated from the half-width of the peak of the X-ray diffraction pattern of the powder is $0.05\mu$ or more, and (d) the shape is substantially spherical.

The present invention further provides a process for producing the above-mentioned powder, characterized by reacting hydrous titanium oxide with barium hydroxide and/or strontium hydroxide at a temperature ranging from 60° C. to less than 110° C. in the presence of 120 to 2,000 moles of water per mole of titanium.

Figure 2:
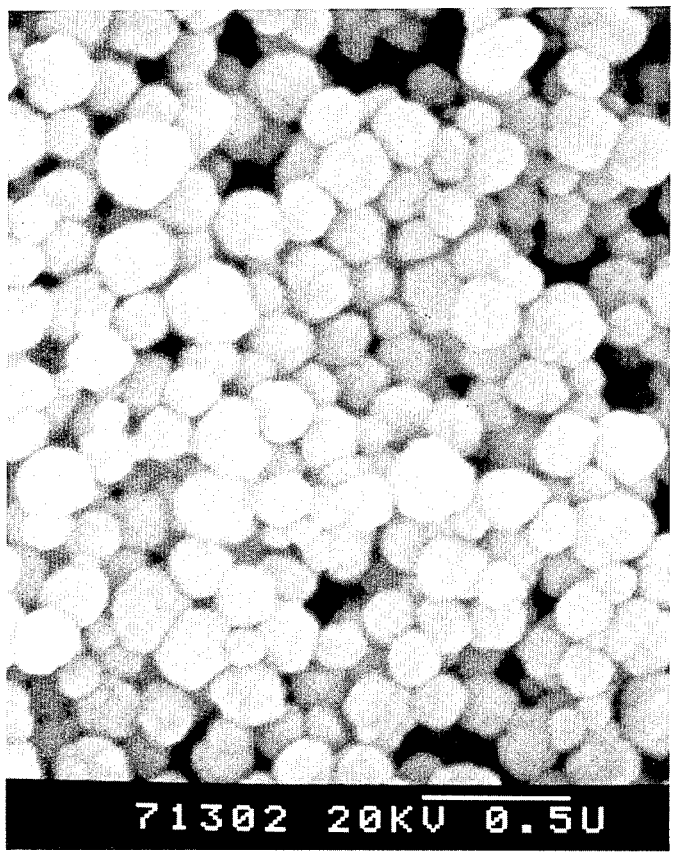
Figure 3:
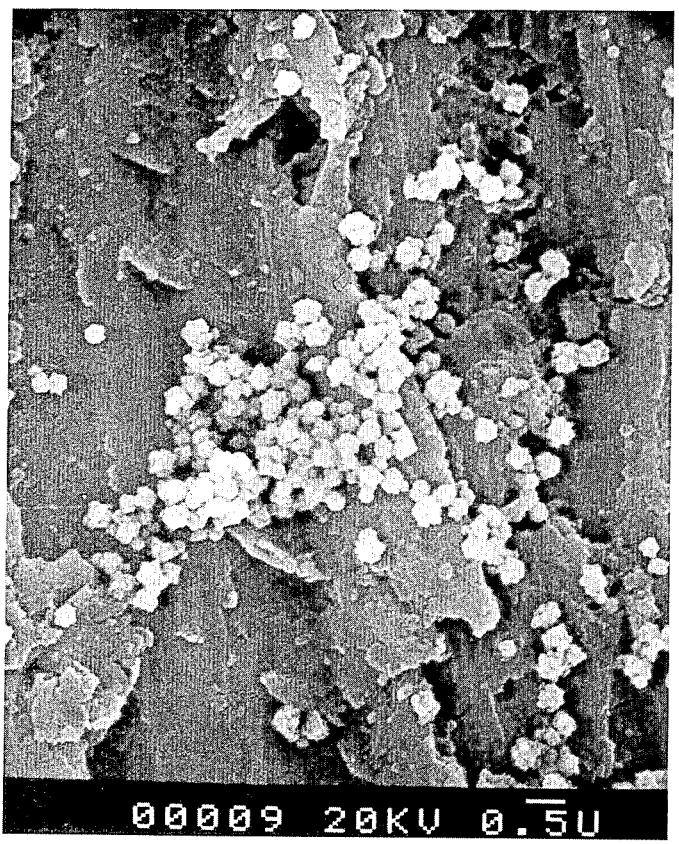
Figure 4:
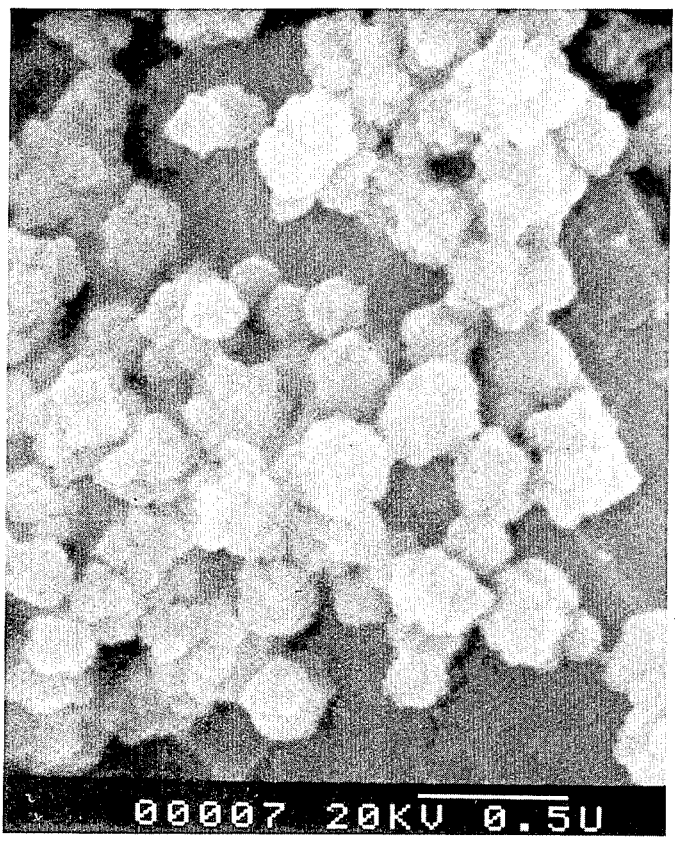

In the accompanying drawings, FIGS. 1 and 2 are scanning electron microphotographs of 13,000 and 50,000 magnifications, respectively, of the barium titanate synthesized in Example 1, and FIGS. 3 and 4 are scanning electron microphotographs of 13,000 and 50,000 magnifications, respectively, of the barium titanate powder synthesized in Example 2.

The expression "substantially spherical" used in the present invention refers to a state as shown in scanning electron microphotographs of FIGS. 1 to 4 in which the shape of each particle is close to sphere as a whole.

The particle diameter and shape of the titanate powder of the present invention can be measured by an observation through a scanning electron microscope (e.g. Scanning Electron Microscope Model S-430, manufactured by Hitachi, Ltd.).

The titanate powder of the present invention has an average particle diameter ranging from $0.07\mu$ to $0.5\mu$, but each particle thereof has substantially the same particle diameter, and the standard deviation is 1.5 or less. In the present invention, the average particle diameter $\bar{x}$ determined from an observation through a scanning electron microscope and the standard deviation $\alpha$ are calculated according the following equations using the particle diameter $x_i$ of any one of the n particles which can be seen within the unit visual field, $x_i$ being obtained by measurement:

$$x = \frac{\sum_{i=1}^{n} x_i}{n}$$

$$\alpha = \frac{x + \alpha_{n-1}}{x}$$

$$\text{wherein } \alpha_{n-1} = \sqrt{\frac{\sum_{i=1}^{n}(x_i - x)^2}{n - 1}}$$

and n is preferably at least 1,000.

Each particle of the titanate powder of the present invention has a substantially spherical shape. In this regard, a value obtained by dividing the difference between the largest diameter and the smallest diameter by the largest diameter is 3/10 or less.

The dispersibility of powder can be determined by measuring the particle size distribution of the powder. Particle size distribution can easily be measured, for example, by the use of Micro Photo Sizer SKA-5,000 of Seishin Enterprise Co., Ltd. In the present invention, the particle size distribution of barium titanate powder was measured by dispersing the powder in isopropyl alcohol, adding polyethylene glycol thereto as a dispersing agent, and subjecting the resulting dispersion to measurement of particle size distribution.

In the titanate of the present invention, the average particle size determined from the particle size distribution measurement agrees approximately with the average particle diameter determined by the above-mentioned observation through a scanning electron microscope. Moreover, the particle size distribution is narrow and the standard deviation is 2.0 or less. In the present invention, the average particle size $\bar{x}$ determined from the particle size distribution measured and the standard deviation $\alpha$ are calculated according to the following equations:

$$x = \sum_{i=1}^{n} v_i \cdot x_i$$

$$\alpha = \frac{x + \alpha_n}{x}$$

$$\text{wherein } \alpha_n = \sqrt{\sum_{i=1}^{n} v_i (x_i - x)^2} \text{ and } \sum_{i=1}^{n} v_i = 1$$

In the above equations, $x_i$ is a particle size expressed by an arithmetical average of the largest and smallest diameters of the particles in the small measurement zone i; $v_i$ is a fraction of the volume occupied by the particles in the measurement zone i; and n is the number of the small measurement zone i.

In the present invention, the crystallite diameter can be determined by firstly measuring the half-width of the peak of an X-ray diffraction pattern for powder and then substituting the half-width for the $\beta$ of Scherrer's equation.

$$L = \frac{K\lambda}{\beta \cos\theta}$$

In the above equation, L is a crystallite size; $\lambda$ is the wavelength of X-ray used; $\beta$ is the half-width of the peak of an X-ray diffraction pattern; $\theta$ is the diffraction angle of X-ray used; and K is a constant, which is assumed to be 0.9 in the present invention. The above half-width $\beta$ is determined from the peak corrected by the use of a silicon crystal on the assumption that the shape of the peak of X-ray diffraction pattern for powder measured be the Cauchy profile.

The crystallite size, calculated according to the above equation, of the titanate powder of the present invention agrees approximately with the average particle diameter of the same powder determined by the above-mentioned observation through a scanning electron microscope. That is, approximately one particle consists of one to dozens of crystallites and the crystallite sizes actually measured are $0.05\mu$ or more.

In the present invention, the specific surface area can be measured by means of a specific surface area analyzer of the gas adsorption type (e.g. Sorptomatic 1800, manufactured by Carlo Erba).

The specific surface area of the titanate powder of the present invention which area has actually measured does not exceed 2.5 times the specific surface area calculated from the average particle diameter of the titanate powder on the assumption that the particles of the powder have a true sphere shape. Moreover, in general, the ratio of the specific surface area actually measured to the specific surface area calculated has a tendency of decreasing according as the specific surface area increases, and the specific surface area measured does not exceed 20 $m^2/g$. Accordingly, the particle diameter obtained by back calculation from the specific surface area actually measured agrees approximately with the average particle diameter, and it can also be confirmed from this fact that the titanate powder of the present invention is spherical and of non-agglomerating nature.

The titanate powder of the present invention having the above-mentioned characteristics cannot be produced by any of the conventionally known methods described above, and can be produced only when the novel synthesis method described herein is used.

That is, the process for the production of the titanate powder of the present invention is characterized by reacting hydrous titanium oxide with barium hydroxide and/or strontium hydroxide, with stirring, at a temperature ranging from 60° C. to less than 110° C. in the presence of 120 to 2,000 moles of water per mole of titanium.

The reaction in the present process is greatly impaired by the presence of carbon dioxide. Accordingly, in carrying out the reaction, sufficient care must be taken to ensure that no carbon dioxide is present in the reaction system. Further, carbon dioxide must be removed, prior to the reaction, from all the reactants (hydrous titanium oxide, barium hydroxide and/or strontium hydroxide), the water used for dispersion and dilution of the reactants, etc.

In the present invention, as the hydrous titanium oxide, there may be used at least one compound selected from orthotitanic acid, metatitanic acid and titanium oxide. Orthotitanic acid is most preferred in view of its high reactivity. They can be used in the form of solid or gel. Orthotitanic acid can easily be obtained by alkali-treating a chloride, a sulfate, an oxalate, etc. of titanium. The use of the chloride is preferred. Metatitanic acid and titanium dioxide are easily obtained by heating orthotitanic acid because the constitution water which orthotitanic acid has is gradually lost by this heating.

Both the barium hydroxide and the strontium hydroxide used in the present invention are white solids ordinarily containing water. They may be used as they are or in the form of an aqueous solution. Since both barium hydroxide and strontium hydroxide easily react with carbon dioxide in air to form the respective carbonates, they must be purified, prior to their use in the reaction, to remove the respective carbonates, and the purified hydroxides must be handled carefully to prevent their recontact with carbon dioxide. The purification of barium hydroxide and strontium hydroxide can be conducted by a known method.

The use of a relatively large quantity of water in the present invention results in the following effects: Since the reaction of hydrous titanium oxide with barium hydroxide and/or strontium hydroxide proceeds mildly, the powder formed has a large crystallite diameter and is free from micro cracks, small in specific surface area and substantially free from agglomeration. Further, since fluidization is possible during the reaction, the powder formed is substantially spherical in particle shape and uniform in particle diameter distribution.

In the present invention, mixing is conducted in the presence of water and this has effects of making the shape of particles substantially spherical and the particle diameter distribution uniform. The mixing method may be carried out in a known manner such as stirring, vibration, rotation, ball mill treatment or the like. In the present invention, the reaction time is preferably 30 min or more for completing the reaction as much as possible, though it is not critical. If necessary, the reaction mixture can be calcined for completion of the reaction. In that case, the calcining temperature is preferably 1,000° C. or less. If the calcining temperature is more than 1,000° C., sintering begins to occur, causing powder particles to be firmly bonded to one another and resulting in particle growth, which impairs the characteristics of the present invention.

In the present invention, the quantity of water used is preferably 120 to 2,000 moles, more preferably 200 to 1,000 moles, per mole of titanium. In the present process, the ratio of barium and/or strontium to titanium in the titanate powder produced is greatly affected by the quantity of water used in the reaction. That is, when the quantity of water is in the range of 200 to 1,000 moles per mole of titanium, the ratio of barium and/or strontium to titanium is about 1 and, as the water quantity deviates from the above range, the ratio becomes smaller. When the water quantity is less than 120 moles or more than 2,000 moles per mole of titanium, the ratio is too small. Further, according as the water quantity decreases even in the above range, the fluidity of the starting material mixture reduces, and when the water quantity is less than 120 moles, the fluidity is lost and this not only makes difficult the production of a powder having a spherical shape and a uniform particle diameter but also increases the reactivity between hydrous titanium oxide and barium hydroxide and/or strontium hydroxide, including the formation of a powder having small crystallites, pores, a large specific surface area and accordingly a high agglomeration tendency. When the water quantity exceeds 10,000 moles per mole of titanium, the concentration of reactants in the reaction system is reduced, whereby the reactivity is decreased and it is practically difficult to carry out the reaction.

In order to effectively carry out the reaction in the present invention, the quantity of barium hydroxide and/or strontium hydroxide is preferably 1.3 to 5.0 moles, more preferably 1.5 to 3.5 moles, per mole of the hydrous titanium oxide. When the quantity is in the range of 1.5 to 3.5 moles, a complete reaction takes place and the ratio of barium and/or strontium to titanium in the titanate formed becomes 1. As the quantity deviates from the range of 1.5 to 3.5 moles, the ratio becomes less than 1 and, when the quantity is less than 1.3 moles or more than 5.0 moles, the ratio becomes too small and the titanate powder obtained cannot be used in practice.

In the present invention, the reaction is effected at a temperature of 60° C. to less than 110° C. The reason therefor is that when the reaction temperature is less than 60° C., the rate of the reaction between hydrous titanium oxide and barium hydroxide and/or strontium hydroxide is too slow to be practical. When the temperature is 110° C. or more, the reaction becomes a hydrothermal reaction, which increases the cost of reaction apparatus, causes particle growth in the particles formed, and makes it difficult to produce a powder having a very small and uniform particle diameter.

The barium titanate and/or the strontium titanate thus obtained is water-washed, filtered, dried and, optionally, calcined at an appropriate temperature in a conventional manner, followed by washing with a weak acid, water-washing, filtration and drying in a conventional manner.

The titanate powder of the present invention is small in particle diameter and uniform in particle diameter distribution. Accordingly, this powder has a high reactivity with various doping agents and is useful as a starting material for not only multi-layer ceramic condensers but also various other condensers, PTC elements, semiconductors, etc.

Further, the sintering temperature for the titanate powder of the present invention is 100° to 200° C. lower than that for conventional titanate powders. This can reduce the energy cost of sintering and further, when the baking of electrode is conducted concurrently with the sintering of condenser as in multi-layer ceramic condensers, can significantly reduce the cost of electrode.

The titanate powder of the present invention may be a mixture or solid solution with other chemical elements.

The present invention will be explained in more detail below referring to Examples, which are merely by way of illustration and not by way limitation.

EXAMPLE 1

0.5 Moles of gel-like orthotitanic acid containing 94% of water and 2 liters of water were placed in a reactor. Nitrogen gas was blown into the reactor to replace the atmosphere inside the reactor with nitrogen. With continuing the supply of nitrogen gas, the reactor was allowed to stand for 24 hr. Separately, 354 g of barium hydroxide octahydrate was dissolved in 1 liter of water at 90° C. The solution was boiled and then filtered to remove barium carbonate. The filtrate was added to the above reactor containing orthotitanic acid and water, in the presence of nitrogen gas, with taking sufficient care so as not to allow the filtrate to come into contact with air. With supplying nitrogen gas to the reactor and stirring the reactor contents, the reactor contents were heated at 100° C. for 4 hr by means of an oil bath to effect reaction. After completion of the reaction, the reaction mixture was allowed to stand for about 5 min. The supernatant was removed and 3 liters of hot water was added to the residue. After stirring and washing, the residue was filtered. This operation of washing and filtration was repeated three times (a total of 9 liters of hot water was used for washing of the residue). Then, the residue was washed with 0.5 liter of 1N acetic acid and filtered. Further, an operation of washing with pure water and filtration was repeated three times. Thereafter, the residue was dried at 100° C. for 40 hr in air, whereby 224 g of barium titanate was obtained, and this quantity corresponded to a yield of 96%. Considering the losses due to washing, filtration, etc. after the synthesis, the yield was very satisfactory.

Measuring the ratio of barium to titanium in the barium titanate, it was 1.001. This powder was found to satisfy the stoichiometric ratio of barium to titanium within the range of experimental error.

Further, there were conducted an observation through a scanning electron microscope, a measurement of specific surface area and an X-ray diffractometry. From these, the product was found to be a cubic system barium titanate powder consisting of uniform, substantially spherical particles with an average particle diameter of $0.21\mu$ and a standard deviation of 1.28 and having a specific surface area of $8.0 \, m^2/g$ and a crystallite size of 945 Å. With respect to the specific surface area of $8.0 \, m^2/g$, the average particle diameter calculated on the assumption that all the particles of the powder obtained be spherical was $0.12\mu$ and this agreed approximately with the average particle diameter measured from the observation through a scanning electron microscope. Furthermore, the particle size distribution of the barium powder obtained was measured. It gave an average particle size of $0.32\mu$ and a standard deviation of 1.78, whereby the powder was found to be good in dispersion.

EXAMPLE 2

0.5 Mole of gel-like orthotitanic acid containing 93% of water was dispersed in 2 liters of water in a reactor. After nitrogen replacement, the reactor was allowed to stand for 20 hr. Separately, 268 g of barium hydroxide octahydrate was dissolved in 1 liter of water at 90° C. After filtration, the filtrate was added to the above reactor in the presence of nitrogen gas, with taking sufficient care so as not to allow the filtrate to come into contact with air. With supplying nitrogen gas to the reactor and stirring the reactor contents, the reactor contents were heated at 100° C. for 2 hr by means of an oil bath to effect reaction. After completion of the reaction, the reaction mixture was treated in the same manner as in Example 1, to obtain a barium titanate.

This barium titanate powder had a barium to titanium ratio of 1.004. Further, there were conducted an observation through a scanning electron microscope, a measurement of specific surface area and an X-ray diffractometry. From these, the powder was found to be cubic system barium titanate powder having an average particle diameter of $0.28\mu$, a standard deviation of 1.41, a specific surface area of $7.7 \, m^2/g$ and a crystallite size of 1101 Å. With respect to the specific surface area of $7.7 \, m^2/g$, the average particle diameter calculated on the assumption that all the particles of the powder obtained be spherical was $0.13\mu$ and this agreed approximately with the average particle diameter measured from the observation through a scanning electron microscope. Further, the particle size distribution of the barium titanate powder obtained was measured, to find that the powder had an average particle size of $0.38\mu$ and a standard deviation of 1.82, and a good dispersibility.

EXAMPLE 3

0.5 Mole of gel-like orthotitanic acid having a water content of 91% and 220 ml of water were placed in a reactor. Nitrogen gas was blown into the reactor to replace the atmosphere inside the reactor with nitrogen. With continuing the supply of nitrogen gas, the reactor was allowed to stand for 24 hr. Separately, 355 g of barium hydroxide octahydrate was dissolved in 500 ml of water at 90° C. After filtration of the resulting solution, the resulting filtrate was added to the above reactor in the presence of nitrogen gas, with sufficient care so as not to allow the filtrate to come into contact with air. With supplying nitrogen gas to the reactor and stirring the reactor contents, the reactor contents were heated 100° C. for 4 hr by means of an oil bath to effect reaction. After completion of the reaction, the reaction mixture was treated in the same manner as in Example 1, to obtain a barium titanate powder.

Measuring the ratio of barium to titanium in the above barium titanate powder, it was 0.991 and slightly deviated from 1. Further, there were conducted an observation through a scanning electron microscope, a measurement of specific surface area and an X-ray diffractometry. From these, it was found that the average particle diameter of the powder was $0.12\mu$, the standard deviation was 1.7, the specific surface area was 12.7 $m^2/g$, and the crystallite size was 530 Å. The particles of the powder were substantially spherical. Furthermore, the particle size distribution was measured to find that the average particle size was $0.29\mu$ and the standard deviation was 1.97, and that there was slight agglomeration of particles.

EXAMPLE 4

0.5 Mole of orthotitanic acid having a water content of 95% was dispersed in 8.6 liters of water. The resulting dispersion was placed in a reactor. Thereto was added, in the same manner as in Example 1, a solution of 473 g of barium hydroxide dissolved in 2 liters of hot water at 100° C. The mixture was subjected to reaction at 100° C. for 6 hr and then to a post-treatment, whereby a barium titanate powder was obtained.

This powder had a barium to titanium ratio of 0.994 which slightly deviated from 1. As a result of an observation through a scanning electron microscope, a measurement of specific surface area and an X-ray diffractometry, it was found that the powder had an average particle diameter of $0.31\mu$, a specific surface area of 5.5 $m^2/g$ and a crystallite size of 1280 Å. The measurement of a particle size distribution gave an average particle size of $0.56\mu$ and a standard deviation of 1.96.

The particles of this powder were substantially spherical in shape but slightly angular.

EXAMPLE 5

0.5 Mole of gel-like orthotitanic acid having a water content of 94% and 2 liters of water were placed in a reactor. With blowing nitrogen gas into the reactor, the reactor was allowed to stand for 20 hr. Thereto was added a solution of 270 g of strontium hydroxide dissolved in 1 liter of water at 90° C. The resulting mixture was subjected to reaction at 100° C. for 4 hr in the same manner as in Example 1. The reaction mixture was washed with hot water, acetic acid and pure water in this order, and then dried at 100° C. in air, to obtain a strontium titanate powder.

This powder was subjected to an observation through a scanning electron microscope, a measurement of specific surface area and an X-ray diffractometry. As a result, the powder was found to be a cubic system strontium titanate powder having an average particle diameter of $0.15\mu$, a specific surface area of 8.4 $m^2/g$, a crystallite size of 1028 Å and a uniform and substantially spherical shape.

EXAMPLE 6

0.5 Mole of orthotitanic acid having a water content of 94% was dispersed in 2 liters of water. Thereto was added a solution of 159 g of barium hydroxide and 110 g of strontium hydroxide dissolved in 1 liter of water at 90° C. The mixture was subjected to the same manner as in Example 1 under the same conditions as in Example 1, whereby a powder was synthesized. This powder was subjected to an X-ray diffractometry. As a result, the powder was found to consist of a solid solution of barium titanate and strontium titanate. Further, there were conducted an observation through an electron microscope and a measurement of specific surface area. The results revealed that the powder was a cubic system solid solution of barium titanate and strontium titanate having an average particle diameter of $0.20\mu$, a standard deviation of 1.31, a specific surface area of 7.4 $m^2/g$ and a uniform and substantially spherical shape. From the measurement of particle size distribution, the powder had an average particle size of $0.30\mu$, a standard deviation of 1.80, and a good dispersibility.

What is claimed is:

1. A powder consisting of barium titanate powder, strontium titanate powder or a solid solution thereof, wherein (a) the average particle diameter is 0.07 to $0.5\mu$, (b) the specific surface area measured is 20 $m^2/g$ or less and does not exceed 2.5 times the specific surface area calculated from the average particle diameter on the assumption that the powder particles be spherical, (c) the crystallite size calculated from the half-width of the peak of the X-ray diffraction pattern for the powder is $0.05\mu$ or more, and (d) the particle shape is substantially spherical.

2. A powder according to claim 1, wherein each powder particle consists of one to dozens of crystallites and has substantially the same diameter and the standard deviation of particle diameter is 1.5 or less.

3. A powder of barium titanate according to claim 1, wherein the specific surface area is 2 to 15 $m^2/g$ and the crystallite size ranges from $0.05\mu$ to $0.5\mu$.

4. A process for producing a powder consisting of barium titanate powder, strontium titanate powder or a solid solution thereof as claimed in claim 1, comprising the step of reacting hydrous titanium oxide with a hydroxide selected from the group consisting of barium hydroxide, strontium hydroxide and a mixtuyre of barium hydroxide and strontium hydroxide at a temperature of 60° C. to less than 110° C. in the presence of 120 to 2,000 moles of water per mole of titanium.

5. A process according to claim 4, wherein the water is substantially free from carbon dioxide and the reaction is conducted in an atmosphere free from carbon dioxide.

6. A process according to claim 4, wherein the hydrous titanium oxide is at least one compound selected from the group consisting of orthotitanic acid, metatitanic acid and titanium dioxide.

7. A process according to claim 4, wherein the hydrous titanium oxide is orthotitanic acid.

8. A process according to claim 4, wherein the amount of water is 200 to 1,000 moles per mole of titanium.

9. A process according to claim 4, wherein the quantity of barium hydroxide and/or strontium hydroxide is 1.3 to 5.0 moles per mole of hydrous titanium oxide.

10. A process according to claim 4, wherein the quantity of barium hydroxide and/or strontium hydroxide is 1.5 to 3.5 moles of hydrous titanium oxide.

11. A process according to claim 4, wherein the reaction mixture is subjected to water washing, filtration and drying in a conventional manner.

12. A process according to claim 11, wherein the dried product is calcined at an appropriate temperature, washed with a weak acid, water-washed, filtered and dried.

* * * * *